(12) United States Patent
Chen et al.

(10) Patent No.: US 11,757,344 B2
(45) Date of Patent: Sep. 12, 2023

(54) CONVERSION CIRCUIT

(71) Applicant: Delta Electronics, Inc., Taoyuan (TW)

(72) Inventors: Chien-Jen Chen, Taoyuan (TW);
Chao-Shun Yang, Taoyuan (TW);
Cheng-Hsun Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 28 days.

(21) Appl. No.: 17/703,304

(22) Filed: Mar. 24, 2022

(65) Prior Publication Data

US 2023/0231463 A1 Jul. 20, 2023

(30) Foreign Application Priority Data

Jan. 20, 2022 (CN) .......................... 202210066970.6

(51) Int. Cl.
*H02M 3/158* (2006.01)
*H02M 1/00* (2006.01)
*H02M 7/04* (2006.01)

(52) U.S. Cl.
CPC ......... *H02M 1/0006* (2021.05); *H02M 1/007* (2021.05); *H02M 3/158* (2013.01); *H02M 7/05* (2021.05); *H02M 1/009* (2021.05)

(58) Field of Classification Search
CPC ...... H02M 1/0006; H02M 1/007; H02M 7/05; H02M 1/0067; H02M 3/158; H02M 3/155; H02M 1/156; H02M 1/009; H02M 1/0083

See application file for complete search history.

(56) References Cited

U.S. PATENT DOCUMENTS

| 8,102,157 | B2 * | 1/2012 | Abe | ............... | H02M 3/1584 |
| | | | | | 320/166 |
| 2016/0261270 | A1 | 9/2016 | Kim et al. | | |
| 2018/0241308 | A1 * | 8/2018 | Matsuura | ............ | H02M 3/1563 |
| 2020/0083813 | A1 | 3/2020 | Tang et al. | | |

FOREIGN PATENT DOCUMENTS

| CN | 103563228 A | 2/2014 |
| CN | 103944435 B | 2/2017 |
| CN | 109638949 A | 4/2019 |
| TW | 201541827 A | 11/2015 |
| TW | I718845 B | 2/2021 |

* cited by examiner

*Primary Examiner* — Adolf D Berhane
(74) *Attorney, Agent, or Firm* — KIRTON McCONKIE; Evan R. Witt (57) ABSTRACT

The present disclosure provides a conversion circuit including a power supply module, positive and negative input terminals, positive and negative output terminals, a switch, an inductor, input and output capacitors, and a controller. The power supply module converts an AC power for providing three potentials on three power supply terminals respectively. The potential on the first power supply terminal is higher than the potential on the second power supply terminal, which is higher than the potential on the third power supply terminal. The positive and negative input terminals are electrically connected to the first and third power supply terminals respectively, and a voltage therebetween is an input voltage. The negative output terminal is electrically connected to the third power supply terminal. The controller is electrically connected to the positive input terminal, the second power supply terminal and the switch. A voltage across the controller is lower than the input voltage.

10 Claims, 6 Drawing Sheets

CONVERSION CIRCUIT

CROSS-REFERENCE TO RELATED APPLICATION

This application claims priority to China Patent Application No. 202210066970.6, filed on Jan. 20, 2022, the entire contents of which are incorporated herein by reference for all purposes.

FIELD OF THE INVENTION

The present disclosure relates to a conversion circuit, and more particularly to a conversion circuit with the ranges of the input and output voltages not limited by the withstand voltage of the controller.

BACKGROUND OF THE INVENTION

In the circuit structure of the conventional buck converter, since the controller (control IC) needs power for driving, the input voltage of the buck converter is directly connected to the controller for providing the power needed by the controller. Therefore, the voltage across the controller is equal to the input voltage. Due to the certain withstand voltage range of the controller, the range of the input voltage would be limited by the withstand voltage of the controller actually, which causes the range of the output voltage also be limited.

Therefore, there is a need of providing a conversion circuit to obviate the drawbacks encountered from the prior arts.

SUMMARY OF THE INVENTION

It is an objective of the present disclosure to provide a conversion circuit which separates the low-potential terminal of the input and output voltages from the low-potential terminal of the controller, thereby making the input and output voltage independent from the voltage across the controller. Consequently, the ranges of the input and output voltages are greatly improved with taking the withstand voltage of the controller into consideration, thereby enhancing the applicability of the conversion circuit.

In accordance with an aspect of the present disclosure, there is provided a conversion circuit including a power supply module, a positive input terminal, a negative input terminal, a positive output terminal, a negative output terminal, a first switch, a first inductor, an input capacitor, an output capacitor, and a controller. The power supply module has a first power supply terminal, a second power supply terminal, and a third power supply terminal, and is configured to receive and convert an AC power for providing three potentials on the first, second and third power supply terminals respectively. The potential on the first power supply terminal is higher than the potential on the second power supply terminal, and the potential on the second power supply terminal is higher than the potential on the third power supply terminal. The positive input terminal and the negative input terminal are electrically connected to the first power supply terminal and the third power supply terminal respectively. A voltage between the positive input terminal and the negative input terminal is an input voltage. The negative output terminal is electrically connected to the third power supply terminal, and a voltage between the positive output terminal and the negative output terminal is an output voltage. The first switch and the first inductor are coupled in series between the positive input terminal and the positive output terminal. The input capacitor is coupled between the positive input terminal and the negative input terminal. The output capacitor is coupled between the positive output terminal and the negative output terminal. The controller has an input terminal electrically connected to the positive input terminal, a ground terminal electrically connected to the second power supply terminal, and a control terminal electrically connected to the first switch. A voltage across the controller is lower than the input voltage.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
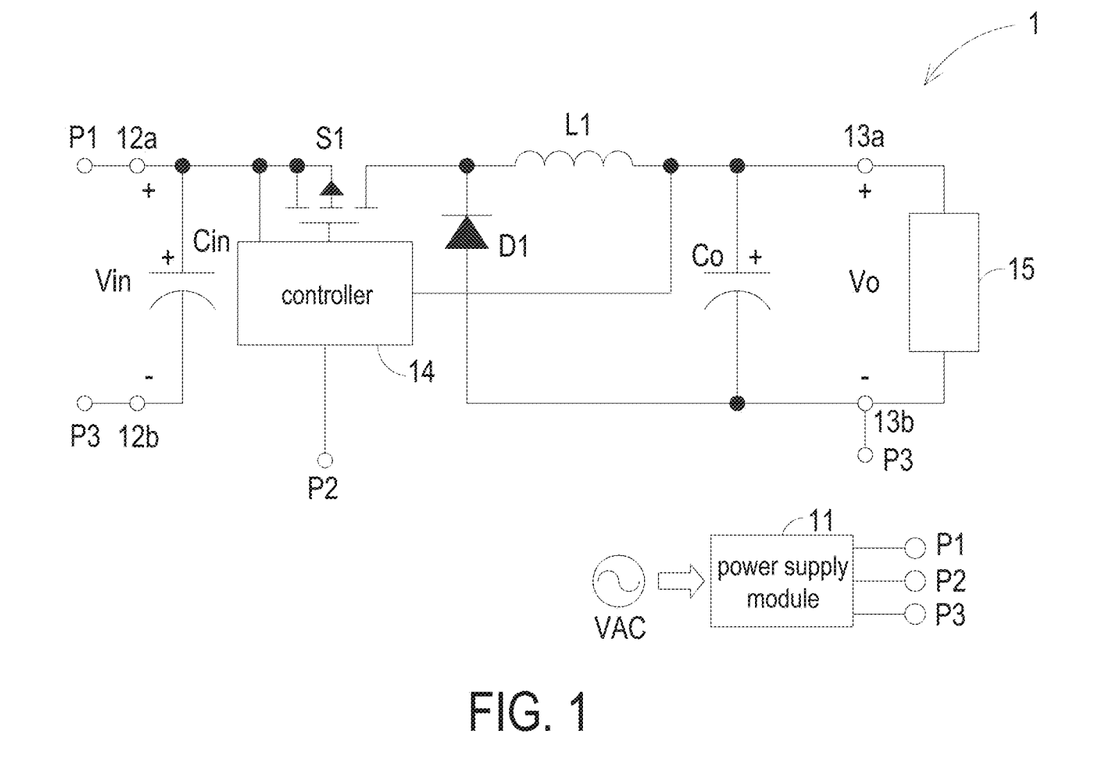
FIG. 1 is a schematic circuit diagram illustrating a conversion circuit according to an embodiment of the present disclosure.

FIG. 1 is a schematic circuit diagram illustrating a conversion circuit according to an embodiment of the present disclosure. As shown in FIG. 1, the conversion circuit 1 includes a power supply module 11, a positive input terminal 12a, a negative input terminal 12b, a positive output terminal 13a, a negative output terminal 13b, a switch S1, an inductor L1, an input capacitor Cin, an output capacitor Co, and a controller 14. The power supply module 11 has a first power supply terminal P1, a second power supply terminal P2, and a third power supply terminal P3. The power supply module 11 is configured to receive and convert an AC power VAC for providing three potentials on the first power supply terminal P1, the second power supply terminal P2, and the third power supply terminal P3 respectively. The potential on the first power supply terminal P1 is higher than the potential on the second power supply terminal P2, and the potential on the second power supply terminal P2 is higher than the potential on the third power supply terminal P3. In other words, the first power supply terminal P1 and the second power supply terminal P2 form a first DC voltage, and the second power supply terminal P2 and the third power supply terminal P3 form a second DC voltage. The positive input terminal 12a and the negative input terminal 12b are electrically connected to the first power supply terminal P1 and the third power supply terminal P3 respectively. The voltage between the positive input terminal 12a and the negative input terminal 12b is an input voltage Vin which equals the sum of the first and second DC voltages. The negative output terminal 13b is electrically connected to the third power supply terminal P3, and the voltage between the positive output terminal 13a and the negative output terminal 13b is an output voltage Vo. The switch S1 and the inductor L1 are coupled in series between the positive input terminal 12a and the positive output terminal 13a. The input capacitor Cin is coupled between the positive input terminal 12a and the negative input terminal 12b, and the output capacitor Co is coupled between the positive output terminal 13a and the negative output terminal 13b. The controller 14 has an input terminal electrically connected to the positive input terminal 12a, a ground terminal electrically connected to the second power supply terminal P2, and a control terminal electrically connected to the switch S1. The controller 14 is configured to control the operation of the switch S1, and the controller 14 is for example but not limited to a control IC (integrated circuit). Since the potential on the second power supply terminal P2 is higher than the potential on the third power supply terminal P3, the voltage between the first power supply terminal P1 and the second power supply terminal P2 (i.e., the first DC voltage) is lower than the voltage between the first power supply terminal P1 and the third power supply terminal P3. Namely, the voltage received by the controller 14 is lower than the input voltage Vin. The positive output terminal 13a and the negative output terminal 13b of the conversion circuit 1 are utilized to supply power to a load 15. The load 15 may be any load requiring constant-current or constant-voltage control. In other words, the current or voltage on the load 15 is constant.

From the above descriptions, the conversion circuit 1 of the present disclosure separates the low-potential terminal of the input voltage Vin and the output voltage Vo (i.e., the third power supply terminal P3) from the low-potential terminal of the controller 14 (i.e., the second power supply terminal P2), thereby making the input voltage Vin and the output voltage Vo independent from the voltage across the controller 14. Consequently, the ranges of the input voltage Vin and the output voltage Vo are greatly improved with taking the withstand voltage of the controller 14 into consideration, thereby enhancing the applicability of the conversion circuit 1. In addition, since the output range increases, the range of the load that can be driven becomes larger. Therefore, the number of the conversion circuits is reduced, the control complexity is reduced, and the cost for the components required for control is reduced.

In an embodiment, the conversion circuit 1 further includes a diode D1. The cathode of the diode D1 is coupled between the switch S1 and the inductor L1, and the anode of the diode D1 is coupled to the negative output terminal 13b. The conversion circuit 1 in this embodiment may include a buck converter. In an embodiment, the switch S1 is a PMOS (P-type metal-oxide-semiconductor field-effect transistor), and the source, gate and drain of the switch S1 are coupled to the positive input terminal 12a, the control terminal of the controller 14, and the inductor L1 respectively. It is noted that the potential on the cathode of the diode D1 in the buck converter is variable. If the switch S1 is NMOS, a complicated driver is required. Therefore, in this embodiment, the switch S1 is implemented by PMOS to simplify the driver, and the switch S1 is turned on and off through controlling the voltage level between the source and gate of the switch S1.

In the present disclosure, the power supply module 11 is configured to receive and convert the AC power VAC for providing three potentials on the first power supply terminal P1, the second power supply terminal P2, and the third power supply terminal P3 respectively. The main purpose of the power supply module 11 is to generate the terminals with three different potentials. The power supply module 11 has various kinds of possible implementations. Three implementations of the power supply module 11 are exemplified as follows, but the power supply module 11 is not limited thereto.

Figure 2:
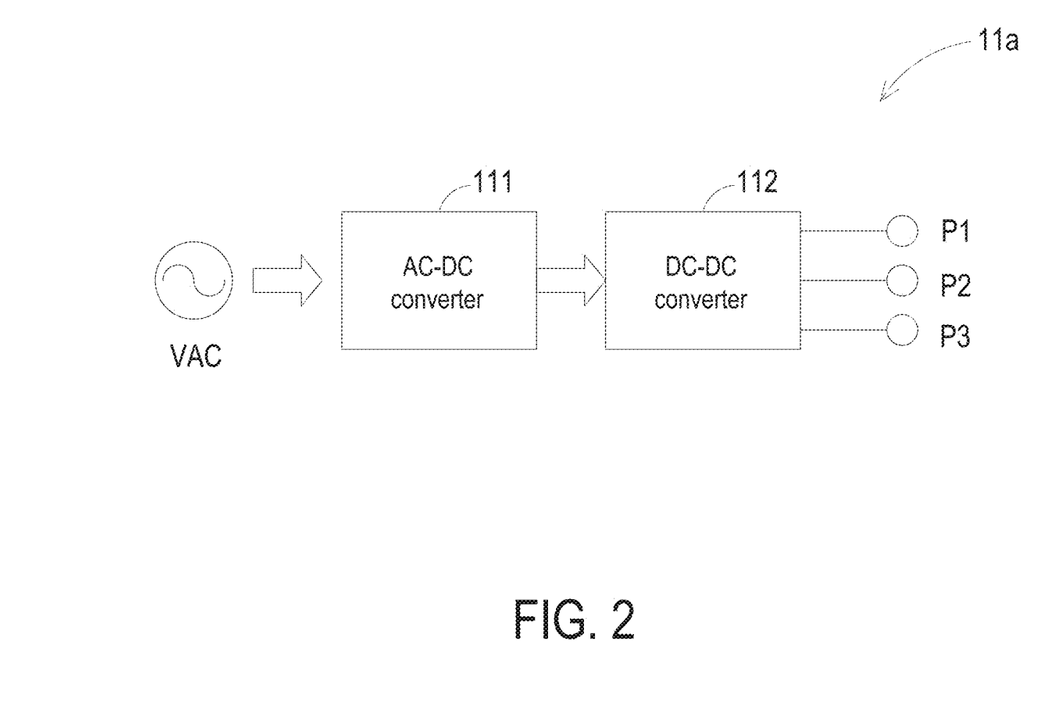
FIG. 2 schematically shows an implementation of the power supply module of FIG. 1.

In an embodiment, as shown in FIG. 2, the power supply module 11a is a two-stage converter including an AC-DC converter 111 and a DC-DC converter 112. The AC-DC converter 111 receives the AC power VAC and converts the AC power VAC into a DC power. The AC-DC converter 111 may be any known power conversion circuit. In the application with high power, the AC-DC converter 111 may be a power factor correction circuit. The DC-DC converter 112 is electrically connected to the AC-DC converter 111, the first power supply terminal P1, the second power supply terminal P2, and the third power supply terminal P3. The DC-DC converter 112 receives the DC power from the AC-DC converter 111 and provides three potentials to the first power supply terminal P1, the second power supply terminal P2, and the third power supply terminal P3 through converting the DC power.

Figure 3:
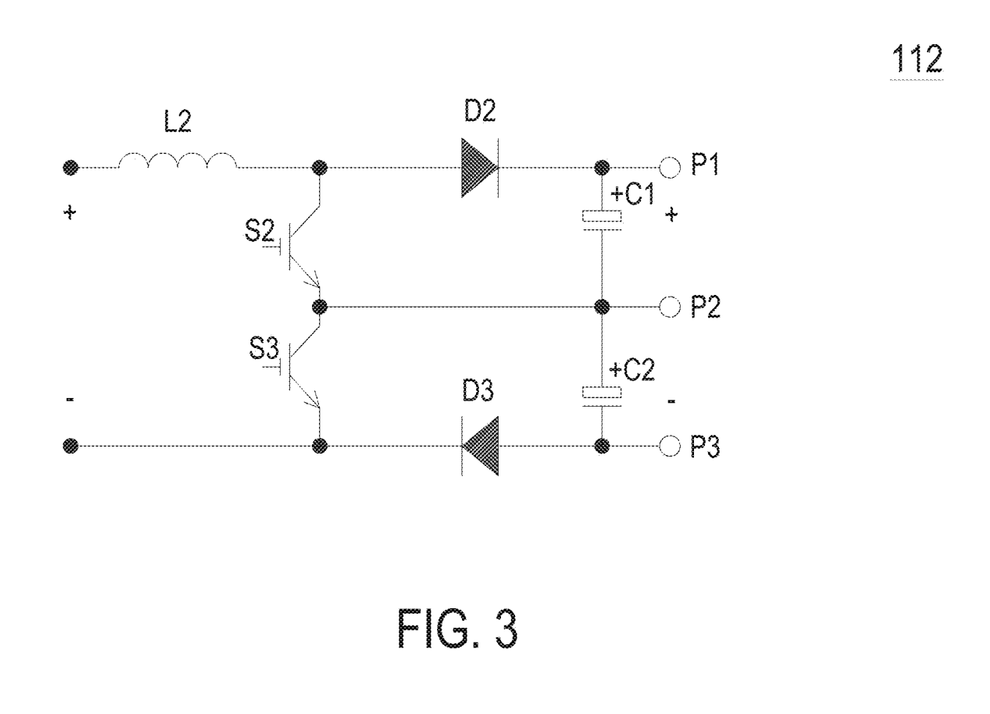
FIG. 3 schematically shows an implementation of the DC-DC converter of FIG. 2.

In an embodiment, the DC-DC converter 112 may adopt an isolated converter (e.g., LLC resonant converter) or a non-isolated converter. FIG. 3 schematically shows an implementation of the DC-DC converter of FIG. 2. As shown in FIG. 3, in this embodiment, the DC-DC converter 112 includes an inductor L2, a switch S2, a switch S3, a diode D2, a diode D3, a capacitor C1, and a capacitor C2. The first terminal of the inductor L2 is electrically connected to the AC-DC converter 111. The anode and cathode of the diode D2 are electrically connected to the second terminal of the inductor L2 and the first power supply terminal P1 respectively. The cathode and anode of the diode D3 are electrically connected to the AC-DC converter 111 and the third power supply terminal P3 respectively. The switches S2 and S3 are connected in series between the anode of diode D2 and the cathode of diode D3. The capacitors C1 and C2 are connected in series between the cathode of diode D2 and the anode of diode D3. The node between the switches S2 and S3 and the node between the capacitors C1 and C2 are both electrically connected to the second power supply terminal P2. In this embodiment, the DC-DC converter 112 is a conversion circuit with positive and negative bus outputs. If the second power supply terminal P2 is regarded as a reference terminal, the first power supply terminal P1 has a positive potential, and the third power supply terminal P3 has a negative potential.

Figure 4:
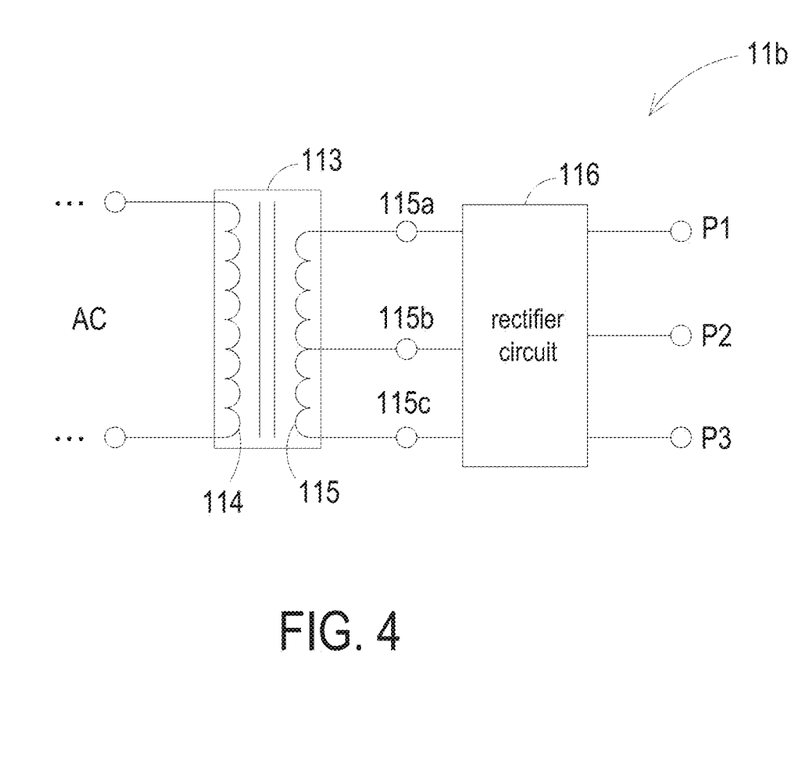
FIG. 4 schematically shows another implementation of the power supply module of FIG. 1.

In an embodiment, as shown in FIG. 4, a part of the power supply module 11b includes a center-tapped transformer 113 and a rectifier circuit 116. The center-tapped transformer 113 includes a primary winding 114 and a secondary winding 115 coupled to each other. The primary winding 114 is utilized to receive an AC signal AC. The secondary winding 115 has a first secondary terminal 115a, a second secondary terminal 115b, and a third secondary terminal 115c. The rectifier circuit 116 is electrically connected to the first secondary terminal 115a, the second secondary terminal 115b, the third secondary terminal 115c, the first power supply terminal P1, the second power supply terminal P2, and the third power supply terminal P3. The rectifier circuit 116 receives the AC signal transmitted by the transformer through the secondary winding 115, and rectifies the received AC signal. Thereby, the rectifier circuit 116 provides a first DC voltage between the first power supply terminal P1 and the second power supply terminal P2 and provides a second DC voltage between the second power supply terminal P2 and the third power supply terminal P3. It is noted that FIG. 4 shows only a part of the power supply module 11b, the primary winding 114 may be coupled to at least one changeover switch (not shown), and the primary winding 114 is allowed to receive the AC signal AC through turning on or off at least one changeover switch. In other words, the circuit shown in FIG. 4 may replace the secondary-side circuit of the conventional isolated converter to provide three power supply terminals.

Figure 5:
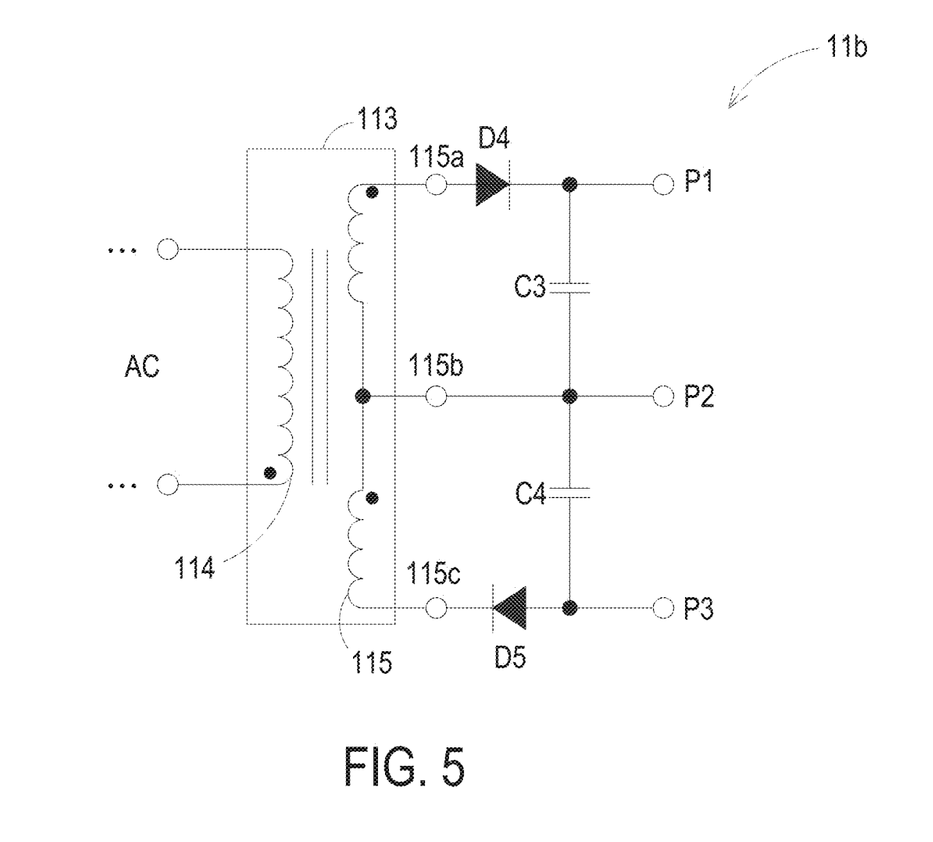
FIG. 5 schematically shows an implementation of the center-tapped transformer and the rectifier circuit of FIG. 4.

FIG. 5 schematically shows an implementation of the center-tapped transformer and the rectifier circuit of FIG. 4. The circuit in this embodiment is utilized to replace the secondary-side circuit of the conventional flyback converter. In this embodiment, the rectifier circuit 116 includes a diode D4, a diode D5, a capacitor C3, and a capacitor C4. The anode and cathode of the diode D4 are electrically connected to the first secondary terminal 115a and the first power supply terminal P1 respectively. The cathode and anode of the diode D5 are electrically connected to the third secondary terminal 115c and the third power supply terminal P3 respectively. The capacitors C3 and C4 are connected in series between the cathode of diode D4 and the anode of diode D5. The node between the capacitors C3 and C4 is electrically connected to the second secondary terminal 115b and the second power supply terminal P2.

Figure 6:
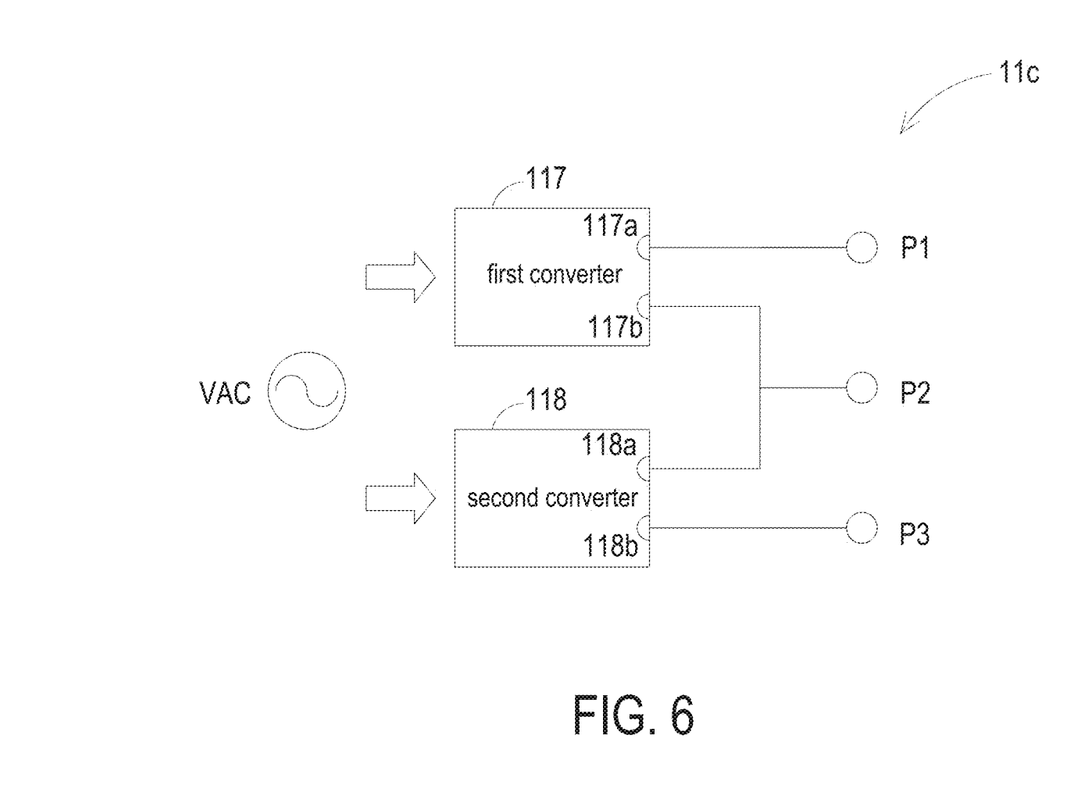
FIG. 6 schematically shows further another implementation of the power supply module of FIG. 1.

In an embodiment, as shown in FIG. 6, the power supply module 11c includes a first converter 117 and a second converter 118. The first converter 117 and the second converter 118 are configured to receive the AC power VAC, and provide three potentials to the first, second and third power supply terminals through converting the AC power VAC. In specific, the first and second converters 117 and 118 may be implemented by conventional power conversion circuits, and the output voltages thereof are serially connected to form the first power supply terminal P1, the second power supply terminal P2, and the third power supply terminal P3. The first output terminal 117a of the first converter 117 is electrically connected to the first power supply terminal P1. The second output terminal 117b of the first converter 117 and the first output terminal 118a of the second converter 118 are electrically connected to the second power supply terminal P2. The second output terminal 118b of the second converter 118 is electrically connected to the third power supply terminal P3. In other words, the first converter 117 receives and converts the AC power VAC to provide a first DC voltage between the first power supply terminal P1 and the second power supply terminal P2, and the second converter 118 receives and converts the AC power VAC to provide a second DC voltage between the second power supply terminal P2 and the third power supply terminal P3. The output of the power supply module 11c is formed by the first DC voltage and the second DC voltage connected in series.

In conclusion, the present disclosure provides a conversion circuit which separates the low-potential terminal of the input and output voltages from the low-potential terminal of the controller, thereby making the input and output voltage independent from the voltage across the controller. Consequently, the ranges of the input and output voltages are greatly improved with taking the withstand voltage of the controller into consideration, thereby enhancing the applicability of the conversion circuit. In addition, since the output range increases, the range of the load that can be driven becomes larger. Therefore, the number of the conversion circuits is reduced, the control complexity is reduced, and the cost for the components required for control is reduced.

While the disclosure has been described in terms of what is presently considered to be the most practical and preferred embodiments, it is to be understood that the disclosure needs not be limited to the disclosed embodiment.

What is claimed is:

1. A conversion circuit, comprising:
a power supply module, having a first power supply terminal, a second power supply terminal, and a third power supply terminal, and configured to receive and convert an AC power for providing three potentials on the first, second and third power supply terminals respectively, wherein the potential on the first power supply terminal is higher than the potential on the second power supply terminal, and the potential on the second power supply terminal is higher than the potential on the third power supply terminal;
a positive input terminal and a negative input terminal, electrically connected to the first power supply terminal and the third power supply terminal respectively, wherein a voltage between the positive input terminal and the negative input terminal is an input voltage;
a positive output terminal and a negative output terminal, wherein the negative output terminal is electrically connected to the third power supply terminal, and a voltage between the positive output terminal and the negative output terminal is an output voltage;
a first switch and a first inductor, coupled in series between the positive input terminal and the positive output terminal;
an input capacitor, coupled between the positive input terminal and the negative input terminal;
an output capacitor, coupled between the positive output terminal and the negative output terminal; and
a controller, having an input terminal electrically connected to the positive input terminal, a ground terminal electrically connected to the second power supply terminal, and a control terminal electrically connected to the first switch, wherein a voltage across the controller is lower than the input voltage.

2. The conversion circuit according to claim 1, further comprising a diode, wherein a cathode of the diode is coupled between the first switch and the first inductor, and an anode of the diode is coupled to the negative output terminal.

3. The conversion circuit according to claim 1, wherein the first switch is a PMOS, a source, a gate, and a drain of the first switch are coupled to the positive input terminal, the control terminal of the controller, and the first inductor.

4. The conversion circuit according to claim 1, wherein the power supply module comprises an AC-DC converter and a DC-DC converter, the AC-DC converter receives the AC power and converts the AC power into a DC power, the DC-DC converter is electrically connected to the AC-DC converter and the first, second and third power supply terminals, the DC-DC converter receives the DC power and provides the three potentials to the first, second and third power supply terminals through converting the DC power.

5. The conversion circuit according to claim 4, wherein the AC-DC converter is a power factor correction circuit.

6. The conversion circuit according to claim 4, wherein the DC-DC converter comprises a second inductor, a second switch, a third switch, a first diode, a second diode, a first capacitor, and a second capacitor, a first terminal of the second inductor is electrically connected to the AC-DC converter, an anode and a cathode of the first diode are electrically connected to a second terminal of the second inductor and the first power supply terminal respectively, a cathode and an anode of the second diode are electrically connected to the AC-DC converter and the third power supply terminal respectively, the second and third switches are connected in series between the anode of the first diode and the cathode of the second diode, the first and second capacitors are connected in series between the cathode of the first diode and the anode of the second diode, and a node between the second and third switches and a node between the first and second capacitors are electrically connected to the second power supply terminal.

7. The conversion circuit according to claim 1, wherein the power supply module comprises a center-tapped transformer and a rectifier circuit, the center-tapped transformer comprises a primary winding and a secondary winding coupled to each other, the primary winding is configured to receive an AC signal, the secondary winding has a first secondary terminal, a second secondary terminal, and a third secondary terminal, the rectifier circuit is electrically connected to the first, second and third secondary terminals and the first, second and third power supply terminals, and the rectifier circuit provides a first DC voltage between the first and second power supply terminals and provides a second DC voltage between the second and third power supply terminals.

8. The conversion circuit according to claim 7, wherein the rectifier circuit comprises a first diode, a second diode, a first capacitor, and a second capacitor, an anode and a cathode of the first diode are electrically connected to the first secondary terminal and the first power supply terminal respectively, a cathode and an anode of the second diode are electrically connected to the third secondary terminal and the third power supply terminal, the first and second capacitors are connected in series between the cathode of the first diode and the anode of the second diode, and a node between the first and second capacitors is electrically connected to the second secondary terminal and the second power supply terminal.

9. The conversion circuit according to claim 7, wherein the primary winding is coupled to at least one changeover switch, and the primary winding is allowed to receive the AC signal through turning on or off the at least one changeover switch.

10. The conversion circuit according to claim 1, wherein the power supply module comprises a first converter and a second converter, the first and second converters are configured to receive the AC power and provide the three potentials to the first, second and third power supply terminals through converting the AC power, a first output terminal of the first converter is electrically connected to the first power supply terminal, a second output terminal of the first converter and a first output terminal of the second converter are electrically connected to the second power supply terminal, and a second output terminal of the second converter is electrically connected to the third power supply terminal.

* * * * *